United States Patent
Grasso et al.

(10) Patent No.: US 9,208,465 B2
(45) Date of Patent: Dec. 8, 2015

(54) SYSTEM AND METHOD FOR ENHANCING CALL CENTER PERFORMANCE

(75) Inventors: Maria Antonietta Grasso, Grenoble (FR); Stefania Castellani, Meylan (FR); David S. Martin, Grenoble (FR); Tommaso Colombino, Grenoble (FR); Jutta K. Willamowski, Grenoble (FR); Grégoire Gerard, Villeurbanne (FR)

(73) Assignee: XEROX Corporation, Norwalk, CT (US)

(*) Notice: Subject to any disclaimer, the term of this patent is extended or adjusted under 35 U.S.C. 154(b) by 571 days.

(21) Appl. No.: 13/308,859

(22) Filed: Dec. 1, 2011

(65) Prior Publication Data

US 2013/0142322 A1 Jun. 6, 2013

(51) Int. Cl.
*H04M 3/00* (2006.01)
*G06Q 10/06* (2012.01)

(52) U.S. Cl.
CPC .................. *G06Q 10/06398* (2013.01)

(58) Field of Classification Search
CPC .............. H04M 3/5175; H04M 3/523; H04M 3/42221; H04M 2203/401; H04M 3/5233
USPC .............. 379/265.06, 265.01–265.02, 265.08
See application file for complete search history.

(56) References Cited

U.S. PATENT DOCUMENTS

| | | | |
|---|---|---|---|
| 6,324,282 B1 | 11/2001 | McIllwaine et al. | |
| 6,459,787 B2 | 10/2002 | McIllwaine et al. | |
| 6,628,777 B1 | 9/2003 | McIllwaine et al. | |
| 6,775,377 B2 | 8/2004 | McIllwaine et al. | |
| 7,398,224 B2 | 7/2008 | Cooper | |
| 7,412,402 B2 | 8/2008 | Cooper | |
| 2001/0049084 A1 | 12/2001 | Mitry | |
| 2003/0048893 A1 | 3/2003 | McIllwaine et al. | |
| 2005/0043986 A1* | 2/2005 | McConnell et al. | 705/11 |
| 2006/0188085 A1 | 8/2006 | Ricketts | |
| 2006/0233348 A1 | 10/2006 | Cooper | |
| 2006/0233349 A1 | 10/2006 | Cooper | |
| 2007/0050238 A1 | 3/2007 | Carr et al. | |
| 2007/0220365 A1 | 9/2007 | Castellani et al. | |
| 2007/0230682 A1* | 10/2007 | Meghan et al. | 379/265.06 |
| 2007/0243936 A1 | 10/2007 | Binenstock | |
| 2008/0045339 A1 | 2/2008 | Lin | |
| 2008/0267386 A1 | 10/2008 | Cooper | |

(Continued)

OTHER PUBLICATIONS

Arcaris, Aug. 16, 2011, http://thenextweb.com/las/2011/08/26/how-chilean-born-arcaris-is-bringing-gamification-to-call-centers/, Retrieved Nov. 18, 2011, pp. 1-6.

(Continued)

*Primary Examiner* — Rasha Al Aubaidi
(74) *Attorney, Agent, or Firm* — Fay Sharpe LLP

(57) ABSTRACT

A system and method for visualizing performance metrics are disclosed. The system includes a data acquisition component which collects information related to a set of agents operating in a work environment, a performance metric computation component which computes, for one of the agents, values for a performance metric at each of a plurality of times within a selected time period, and a representation generator which generates a representation for display to the agent, the representation providing the agent with information on the agent's current value for the performance metric. A processor implements the data acquisition component, the performance metric computation component, and the representation generator.

22 Claims, 12 Drawing Sheets

(56) References Cited

U.S. PATENT DOCUMENTS

2010/0227675 A1 9/2010 Luxton et al.
2011/0040155 A1 2/2011 Guzak et al.
2011/0270771 A1 11/2011 Coursimault et al.
2011/0273739 A1 11/2011 Grasso et al.

OTHER PUBLICATIONS

Castellani, S., et al. "Designing Technology as an Embedded Resource for Troubleshooting", 2009, CSCW, vol. 18, Issue 2, pp. 1-28.

Martin, et al. "Making the Organisation Come Alive: Talking Through and about the Technology in remote banking", Human-Computer Interaction, 2003, vol. 18, Nos. 1 &2, pp. 111-148.

Reeves, B. et al. "Total Engagement: Using Games and Virtual Worlds to Change the Way People Work and Businesses Compete", Harvard Business Press, 2009, pp. 1-4.

Oneill, et al. "From Ethnographic Study to Mixed Reality: A Remote Collaborative Troubleshooting System", Proc. of CSCW 2011, Mar. 19-23, 2011, pp. 1-10.

Oneill, et al. "When a Little Knowledge Isn't a dangerous Thing", Proc. of CHI 2011, May 7-12, pp. 1-10.

Grasso, et al. "The Personal Assessment Tool: A System Learning Communities of Users Shared Printers for Providing Environmental Feedback", ICMLA, Dec. 12-14, 2010, pp. 1-6.

GamificationOrg (2011). http://www.gamification.org/wiki/Gamification ; Last Modified Sep. 25, 2011, pp. 1-6.

U.S. Appl. No. 12/773,165, Ciriza et al., filed Jun. 21, 2010.

U.S. Appl. No. 12/819,437, Grasso et al., filed May 4, 2010.

GamificationEncyclopedia (2011) The Gamification Encyclopedia, http://gamification.org/wiki/Encyclopedia, last modified Nov. 4, 2011, pp. 1-5.

Rypple.(2011) http://rypple.com; pp. 1-2.

Modelmetrics. (2011) "Gaming the Call Center", Apr. 19, 2011, http://www.modelmetrics.com/joel-dubinskys-blog/gaming-the-call-center/, pp. 1-5.

Call Center Games. http://www.callcentergames.com, 2011, Performance Connections, Inc., pp. 1-8.

\* cited by examiner

SYSTEM AND METHOD FOR ENHANCING CALL CENTER PERFORMANCE

BACKGROUND

The exemplary embodiment relates to motivation of performance improvement and finds particular application in connection with a system and method for raising performance among agents working in a common environment, such as a call center.

Call centers are often high pressure work environments where agents typically work according to shifts and time schedules, in cubicles situated in large open spaces while receiving calls assigned to them one after another. Agents are usually grouped into teams to which supervisors are assigned and from whom they receive periodic feedback on their performance. Measures on current call center activities, such as the current queue length, may be displayed in the work environment. However, the rigid reporting structure holds agents to account for their own individual performance alone and any activity-based compensation mechanisms for agents reflect their individual performance but not that of the call center's operations as a whole. It is a challenge to maintain high motivation and performance amongst the agents in this environment. This may be attributed to any of a number of factors, such as a lack of community feeling, poor on-going feedback on individual performance, an absence of reward for mutual support, assistance and knowledge sharing, and a lack of transparency and clarity of career progression possibilities.

Information management systems may provide agents with access to switch data, which shows how long an agent has been on a call. However, the performance trends of specific agents or teams are not provided. The creation of reports aggregating the data would likely be too time-consuming for supervisors, and any reports generated would tend to focus on specific organizational processes, such as reporting on the call center's overall performance or the content of coaching sessions with individual agents. Observational studies in call centers suggest that supervisors and operations managers in call centers are skilled at providing agents with valuable feedback on their performance metrics in their weekly one-to-one coaching sessions. While supervisors would like to have more one-on-one time with their agents, there is a limit to how much time a supervisor can spend, in practice, with any one of his or her agents in the course of a week, and to the time the call center can afford to pull agents out of production time (i.e., taking phone calls) to receive coaching. The net result is that agents receive feedback on their individual and team performance only periodically.

Various methods have been proposed for increasing workers' interest in a given task by adding elements of a game to the task. For example, elements of competition, direct reward, team-supported learning and play around the execution of real work activities have been proposed for use in training environments. More recently, this approach has been also proposed for the support of routine on-going work, rather than simply for specific learning activities. See, for example, Reeves, B., and Read, J. L., "Total Engagement: Using Games and Virtual Worlds to Change the Way People Work and Businesses Compete," Harvard Business Press (2009), for a review of such methods. Some of the methods proposed in this book include: a supervisor checking the team's progress; casting call center metrics as points, ranks, and virtual currency; and making data about the team available for other members to review.

Others have suggested games that are intended to motivate performance but which are implemented outside the working system. Some of these games establish a virtual currency which is used to purchase virtual goods. A player can be credited or debited virtual goods based on the outcome of events in games. These types of game, if applied to a call center environment, may, however, lead to worker distraction rather than raising performance.

There remains a need for a method and system for visualizing performance information which can lead to improvements in performance in a workplace and an increase in worker job satisfaction.

INCORPORATION BY REFERENCE

The following references, the disclosures of which are incorporated herein in their entireties, by reference, are mentioned:

The operation of call centers is discussed in Martin, D., O'Neill, J., Randall, D., and Rouncefield, M. "How Can I Help You? Call Centres, Classification Work and Coordination," J. Computer Supported Cooperative Work, Vol. 16, No. 2, pp. 231-264 (Springer, Dordrecht NL, 2007); and in U.S. Pat. Nos. 6,324,282; 6,459,787, 6,628,777; and 6,775,377, entitled METHOD AND SYSTEM FOR DELIVERY OF INDIVIDUALIZED TRAINING TO CALL CENTER AGENTS, by McIllwaine, et al.

The following relate generally to game systems: Reeves, B., and Read, J. L., "Total Engagement: Using Games and Virtual Worlds to Change the Way People Work and Businesses Compete," Harvard Business Press (2009); "Gaming the Call Center," Modelmetrics (Apr. 19, 2011); U.S. Pub. No. 20100227675, published Sep. 9, 2010, entitled VIRTUAL PLAYING CHIPS IN A MULTIUSER ONLINE GAME NETWORK, by Luxton, et al.; U.S. Pub. No. 20010049084, published Dec. 6, 2001, entitled INTERACTIVE REWARDS-BASED PEDAGOGICAL SYSTEM USING AN ENGINE OF ARTIFICIAL INTELLIGENCE, by Darryl Joseph Mitry; U.S. Pub. No. 20070243936, published Oct. 18, 2007, entitled INTERACTIVE TOURNAMENT CONTEST, by Bill Binenstock, et al.; and U.S. Pub. No. 20080045339, published Feb. 21, 2008, entitled GAMING SYSTEM HAVING AWARD RECOGNITION, by Chang-Han Lin.

Methods for changing user behavior, particularly in the context of printers are disclosed in U.S. Pub. No. 20070220365, published Sep. 20, 2007, entitled METHOD FOR AVOIDING REPETITION OF USER ACTIONS BY USING PAST USERS' EXPERIENCES, by Stefania Castellani, et al.; U.S. Pub. No. 20110270771, published Nov. 3, 2011, entitled SYSTEM AND METHOD FOR A FLEXIBLE MANAGEMENT OF THE ESCALATION OF SUPPORT FOR DEVICES, by Jean-Marc Coursimault, et al., U.S. application Ser. No. 12/773,165, filed on May 4, 2010, entitled SYSTEM AND METHOD FOR PROVIDING ENVIRONMENTAL FEEDBACK TO USERS OF SHARED PRINTERS, by Maria Antonietta Grasso, et al.; U.S. application Ser. No. 12/819,437, filed on Jun. 21, 2010, entitled SYSTEM AND METHOD FOR ENABLING AN ENVIRONMENTALLY INFORMED PRINTER CHOICE AT JOB SUBMISSION TIME, by Victor Ciriza, et al.; Castellani, S., Grasso, A., O'Neill, J., and Roulland, F., "Designing Technology as an Embedded Resource for Troubleshooting," in Computer Supported Cooperative Work (CSCW): Volume 18, Issue 2, page 199 (2009); Grasso, M. A., Willamowski, J., Ciriza, V., Hoppenot, Y., "The Personal Assessment Tool: A System Providing Environmental Feedback to Users of Shared Printers for Providing Environmental Feedback," in Proc. 9th Intern/Conf. of Machine Learning and Applications (ICMLA), Washington, D.C. (12-14 Dec. 2010); O'Neill, J., et al., "From Ethnographic Study to Mixed Reality: A Remote Collaborative Troubleshooting System". In Proc. CSCW 2011—The 2011 ACM Conference on Computer Supported Cooperative Work, Hangzhou, China (Mar. 19-23, 2011).

BRIEF DESCRIPTION

In accordance with one aspect of the exemplary embodiment, a system for visualizing performance metrics is disclosed. The system includes a data acquisition component which collects information related to a set of agents operating in a work environment, a performance metric computation component which computes, for one of the agents, an aggregated value for a performance metric at each of a plurality of times within a selected time period, and a representation generator which generates a representation for display to the agent, the representation providing the agent with information on the agent's current aggregated value for the performance metric for each of the plurality of times. A processor implements the data acquisition component, the performance metric computation component, and the representation generator.

In another aspect, a method for visualizing performance metrics includes collecting information related to a set of agents operating in a work environment. Incrementally, for one of the agents, a respective aggregated value for a performance metric is computed, at each of a plurality of times, within a selected time period. A representation is generated for display to the agent, the representation providing the agent with information on the agent's current value for the performance metric. One or more of the steps of the method may be implemented with a computer processor.

In another aspect, a system for visualizing performance data to agents in a call center includes a server computer which acquires data from a plurality of sources related to a set of the agents and computes, for at least one of the agents, a value for a performance metric at each of a plurality of times within a selected time period, based on the acquired data, at least one of the sources of data comprising switch information for the agent's telephones. A plurality of client computing devices in communication with the server computer is provided. The client computing devices include a client computing device for the at least one agent which displays a representation of the respective agent's values for the performance metric at each of the plurality of times, whereby the agent is able to determine whether the agent is meeting at least one threshold value for the performance metric.

DETAILED DESCRIPTION

Aspects of the exemplary embodiment relate to a system and method for visualizing agents' performance metrics which can result in improved awareness and motivation of agents in a work environment, such as a call center. The exemplary work environment is described in terms of an inbound call center, where agents (human workers) receive calls from customers which are assigned to them immediately as they become available as long as the calls stack up in a call center queue. It is to be appreciated, however, that the system is also applicable to outgoing call centers where agents are initiating calls to customers and to potential customers, and to other work environments where productivity and/or quality measures can be computed.

It has also been observed that performance targets and objectives (whether the objectives are individual, shared, part of the agents' general performance assessment, or part of challenges with special rewards that are above and beyond general performance assessment) that are not perceived as fair and attainable are unlikely to motivate performance. As an example, agents in call centers may be provided with challenges and rewards that are tied to organizational requirements (for example to drive the sales of a specific product or service, or push a specific metric on which the center as a whole is underperforming). However, not all agents have the same skill set, and not all agents have the same margins for improvement on the same metrics. For example, challenging agents with a low value on a specific metric to lower that metric even further is not likely to yield significant performance improvements as these agents are not likely to have margins of improvement on the metric that will benefit the call center as a whole. They are also unlikely to appreciate being pushed on metrics for which they are already performing as expected.

The exemplary system and method can yield improvements of both performance and motivation of call centers' operators, based on the provision of integrated information about their performance, together with the provision of selected game mechanics. The system disclosed herein includes a server side, through which data on call center activities are collected and processed, and a client side, for visualizing (e.g., by displaying a representation) of the resulting information to agents and their supervisors (collectively referred to as "operators"), enabling them to assess the situation at a glance, and providing them with some means to react accordingly.

Figure 1:
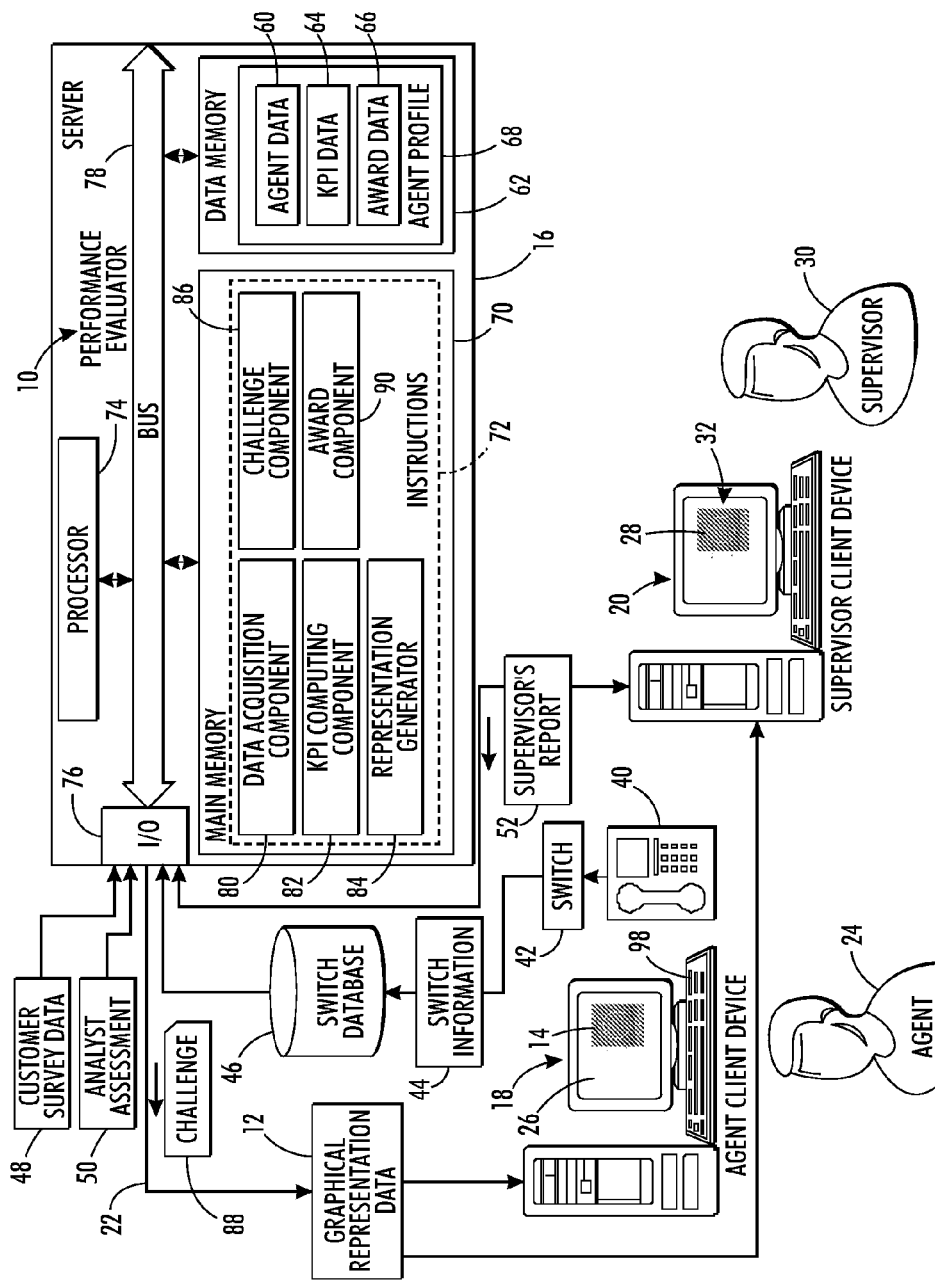
FIG. 1 is a functional block diagram of a system for visualizing agent performance metrics in accordance with one aspect of the exemplary embodiment.

FIG. 1 illustrates an exemplary system for visualizing performance metrics to support situational awareness and motivation in a call center. The system includes a server-side and a client side. At the server side, a performance evaluator 10 generates graphical representation data 12 for display as a representation 14 of an agent's performance at the client side. The exemplary representation 14 shows an agent's performance with respect to one or more performance metrics, referred to herein as Key Performance Indicators (KPIs). The representation 14 may also visualize other performance-related characteristics, such as credits accumulated and skills that have been recognized by the call center, e.g., with badges and/or skill levels. The performance evaluator 10 is hosted wholly or partly on a server computing device 16 which communicates with a set of agent client devices 18 and one or more supervisor client devices 20, via a network 22. Only one agent client device 18 is shown for ease of illustration, but it is to be appreciated that a large number of such agent client devices may be linked to the server 16 via the network 22. The network 22 can be a wired or wireless network, e.g., a local area network or a wide area network, such as the Internet.

The agent's representation 14 is displayed to an agent 24 on a display device 26 of the respective client device 18. A similar representation 28 is displayed to a supervisor 30 for a team of agents on a display device 32 of the respective supervisor client device 20. While the same representation 14 could be provided to all operators, in the exemplary embodiment, agents 24 on a team are each provided with an individualized representation of their own respective performance characteristics, which is a slightly different representation from that received by the supervisor 30 of the team. The representation 14 for the agent may show an overall aggregation of the agent's situation in terms of each of a plurality of performance metrics and other characteristics, and their evolution over time. The supervisor's representation 28 shows the distribution of these characteristics over the team, while also providing access to the information about the individual agents in his for her team.

Typically, the agents 24 are grouped into a team of 10 to 15 workers to which a supervisor 30 is assigned. The agents may receive periodic (typically weekly and monthly) feedback from the supervisor on their performance. As will be appreciated, a group of the supervisors may also have a supervisor, sometimes referred to as an operations manager, who may also be provided with a representation (not shown) analogous to representation 28. A large call center may have a "floor" of up to 800 or 900 agents, or more, operating at the same time.

Each agent is provided with a telephone device 40 on which he receives incoming calls and/or on which he may be able to initiate calls in some cases. Information 44 about the length of each call and time between calls can be generated, based on the state of a call center switch 42 associated with the telephone, which detects whether the agent's telephone is in use or not. The information 44 may be collected and stored in a switch database 46 in memory accessible to the performance evaluator 10. The performance evaluator 10 may also receive, as input, customer survey data 48, derived from customer reviews of the agent 24 as a result of prior telephone interactions with customers, and/or analysts' assessments 50 made by listening to the agents calls. A supervisor's report 52 on the agent, generated by the agent's supervisor 30, may also be received by the performance evaluator 10.

The exemplary representation 14, 28 can provide agents 24 (and/or supervisors 30) with some or all of the following features:

1. A visualization of the salient elements of information on the unfolding work status, at call center, team, and/or agent levels, in an integrated and real-time fashion;
2. Visual indications of current trends and potential performance issues;
3. Indications on and methods for improving their performance and expertise; and
4. Game-related data.

As previously noted, the performance of each agent 24 may be measured according to a set of KPIs. One or more of the KPIs may be derived, at least in part, directly from the call center telephone switch 42. One or more of the KPIs may be derived, at least in part, from customer survey data 48 and/or the assessments 50 performed by quality analysts who listen to recorded phone calls and "score" the agents' performance on a set of pre-defined categories (e.g., "average", "very good", "excellent"). Examples of KPIs derived from the telephone switch include the Average Handle Time (AHT), which represents the average time an agent spends on a phone call with a customer (or performing a task in other contexts), and the After Call Work time (ACW), which represents the average time between ending one call (task) and starting on the next. Another KPI may be the average transfer rate (T), which represents the average percentage of calls which the agent transfers to another agent or supervisor. A quality (Q) KPI may be based on the customer survey data 48 and/or analyst assessment scores 50. As will be appreciated, these performance measures are intended to be exemplary only, and the system is not limited to any specific measures of the agents' performances. The call center as a whole is typically expected to keep their aggregate average KPI values (aggregated over all the agents) within a certain range defined between upper and lower threshold values (or in some cases, to meet only an upper or a lower threshold value). Agents are therefore in turn expected to manage their phone calls so that their individual average KPI values meet the same thresholds or agent-specific thresholds.

The server side 16 of the exemplary system is devoted to the collection and aggregation of the relevant information, e.g., KPI data, and to the support of gaming elements, that are used on the client side to provide integrated information on current work status and trends and indications on how individual and collective performance and quality of work experience could be improved. For example, agent data 60, which includes the customer survey data 48, information 44 retrieved from the database 46, analyst assessments 50, and supervisor's report 52 (or data derived from these data), may be stored in data memory 62 of the server computer 16. Performance metric (KPI) data 64 is generated by the system, based on the agent data 60, and used by the performance evaluator 10 to generate the graphical representation data 12. The agent data 60 and performance metric data 64 for the agent may be stored, together with the agent's accumulated credits 66 and skill-related information, as an agent profile 68.

Figure 2:
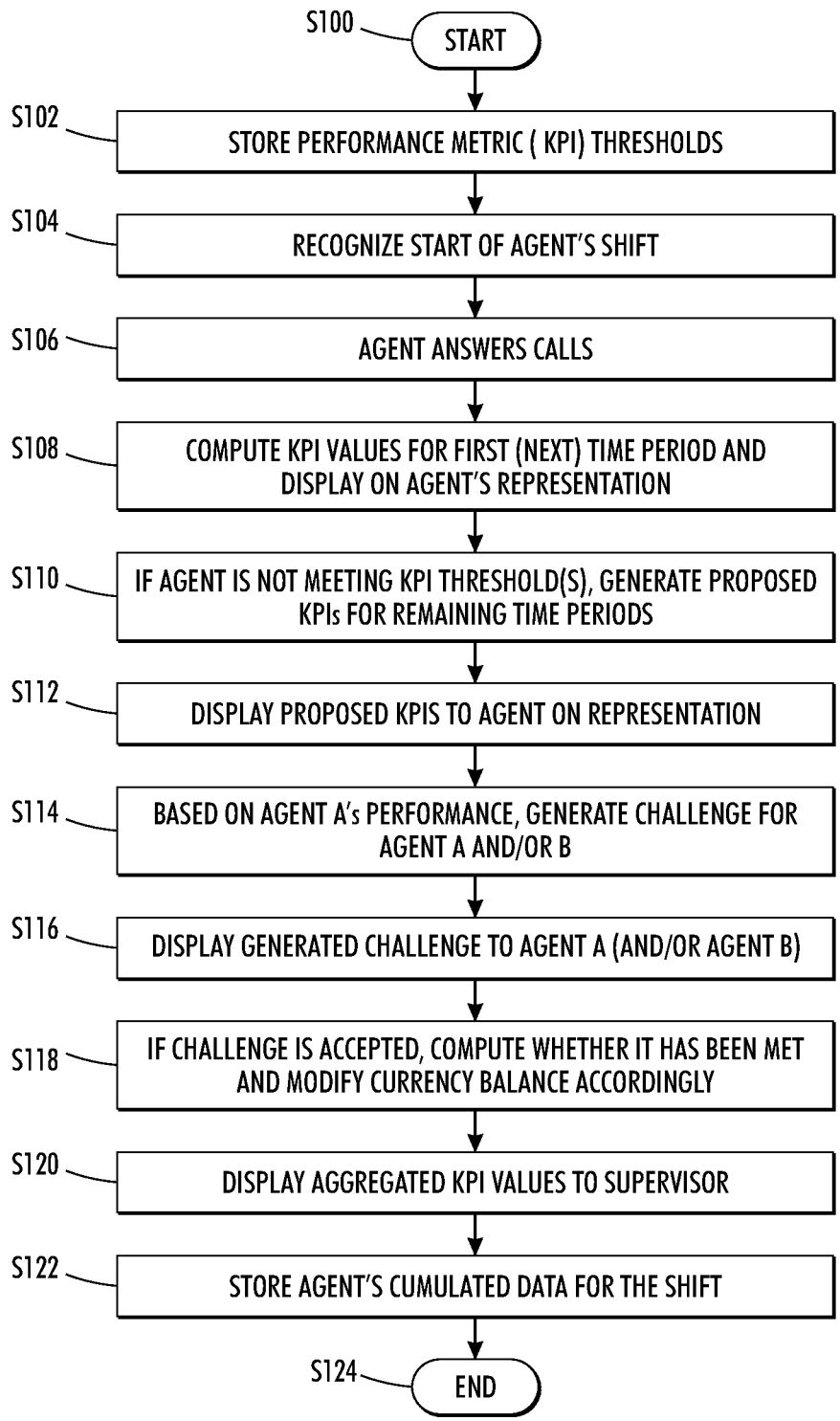
FIG. 2 is a flow chart illustrating a method for visualizing agent performance metrics in accordance with another aspect of the exemplary embodiment.

The exemplary server computer 16 may include main memory 70 which stores instructions 72 for implementing the exemplary method described with respect to FIG. 2, and a processor 74, in communication with the memory 70, for executing the instructions. One or more input/output devices 76 may be provided for receiving the data 44, 48, 50, 52 and for outputting the graphical representation data 12 and the like. Hardware components 62, 70, 74, 76 may communicate via a data/control bus 78.

In an exemplary embodiment, memory 70 stores a data acquisition component 80 for acquiring data 44, 48, 50, 52 from various sources and storing it in memory 62, from which the agent data 60 is extracted. A performance metric (KPI) component 82 generates KPI values 64 periodically for the agent individually and/or the team as a whole, based on the stored agent data 60. A representation generator 84 generates and updates the graphical representation data 12 periodically, based on the aggregated KPI values 64 and stored thresholds for the KPI values.

Challenges may be displayed to the agents via their representations 14. These can be initiated directly by the system or by a supervisor. In one embodiment, a challenge component 86 automatically generates challenges 88 for motivating the agent, for example, when the system detects that one or more of the agent's KPI values does not meet a threshold value, e.g., is above or below the threshold range, or to encourage an agent to tutor a poorly performing agent. Challenges 88 may also be configured to be automatically triggered by the system when specific situations are detected. The virtual currency mechanism can provide motivation for agents who are already performing well for strategically relevant metrics to maintain their current performance for those metrics and improve on others. The challenge component 86 may thus generate challenges for agents that are meeting the thresholds to provide an incentive for them to achieve KPI values which enable the team as a whole to meet the threshold KPI values.

The challenges may be sent to the agents directly, for display in the graphical representation 14, or first proposed to the supervisor 30 for validation, or received from the supervisor for presenting to the agent, or a combination thereof. The challenges, if met, may result in a change in the agent's virtual currency 66. An award component 90 computes and keeps track of the agent's virtual currency account and any other awards, such as levels, leaderboard data, and the like, which is stored in memory as award data. A challenge can be issued to a single agent or in some embodiments, to multiple agents, as a competition. The credits accrued by an agent, in the latter case, may depend not only on his own performance but also on the performance/relative performance of others participating in the challenge.

Figure 3:
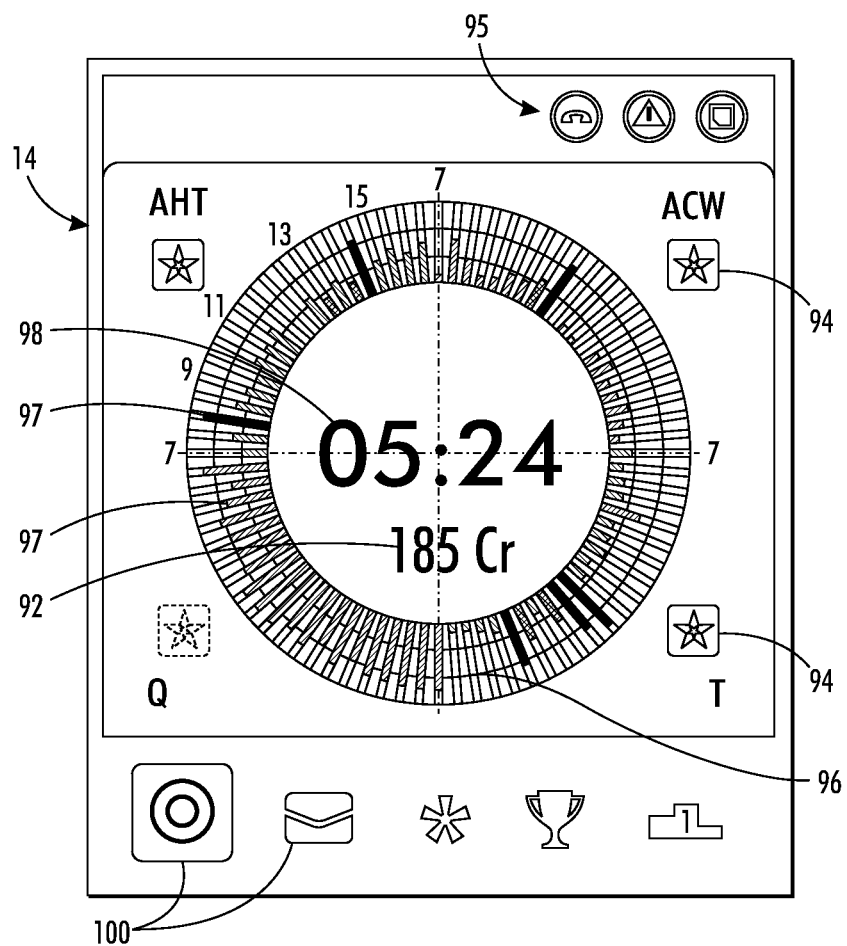
FIG. 3 illustrates a graphical representation of an agent's performance metric values in accordance with another aspect of the exemplary embodiment.

A representation of the agent's current virtual currency may be displayed in the representation 14, as shown at 92 in FIG. 3. Other features displayed on the representation 14 may include representations of the Agent's level awards 94, and the agent's phone status, shown at 95, which indicates whether he is currently on a call, as well as a representation 96 of one or more of the agent's KPI metrics, showing the agent's cumulative average (since the beginning of the shift) of the respective metric, for each of a sequential set of time periods for which the agent is scheduled to be taking calls.

The server computer memory 62, 70 may be separate or combined and may represent any type of non-transitory computer readable medium such as random access memory (RAM), read only memory (ROM), magnetic disk or tape, optical disk, flash memory, or holographic memory. In one embodiment, the memory 62, 70 comprises a combination of random access memory and read only memory. In some embodiments, the processor 74 and memory 62 and/or 70 may be combined in a single chip. The network interface 76 allows the computer to communicate with other devices via the computer network 22, such as a local area network (LAN) or wide area network (WAN), or the internet, and may comprise a modulator/demodulator (MODEM).

The digital processor 74 can be variously embodied, such as by a single-core processor, a dual-core processor (or more generally by a multiple-core processor), a digital processor and cooperating math coprocessor, a digital controller, or the like. The digital processor 74, in addition to controlling the operation of the computer 16, executes instructions stored in memory 62 for performing the server side operations of the method outlined in FIG. 2.

The client devices 18, 20 may be similarly configured to the server computer and may each comprise one or more specific or general purpose computing devices, such as a PC, such as a desktop, a laptop, palmtop computer, portable digital assistant (PDA), server computer, cellular telephone, tablet computer, pager, combination thereof, or other computing device capable of executing instructions for performing the client side operations of the exemplary method. Each of client devices 18, 20 may have memory, a processor, and an input/output device for communicating with other devices via the network 22. The client devices 18, 20 may also include a user input device 98, such as a keyboard, keypad, touchscreen, cursor control device, or combination thereof, or the like, for inputting commands to the respective processor and interacting with the displayed representation 14, e.g. for viewing various windows of the representation and accepting challenges.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference now to FIG. 2, a method for visualizing performance metrics in accordance with one aspect of the exemplary embodiment is illustrated. The method begins at S100.

At S102, performance metric (e.g., KPI) thresholds are stored in memory for each of a set of performance metrics.

At S104, an agent logs on at the start of his or her shift, which is recognized by the system, and at S106, the agent begins to answer calls (or performs other measurable tasks).

At S108, after predetermined time period, a first set of KPI values is computed for the agent and a representation of each of the KPI values for a first time period is generated and displayed to the agent on the representation 14. The representation indicates whether the agent is meeting the threshold for each of the set of KPIs. For example, the representation shows the cumulative average as well as a graphic representation of whether this meets the KPI thresholds, e.g., by using different colors for values meeting the threshold and for those which do not. The method returns to S106, where the agent continues to answer calls and at S108 the performance metric values are recomputed and displayed. The new performance metric values are the cumulated average over the shift so far. This is repeated at predetermined time intervals throughout the agents shift. For example, step S108 is performed at least two or at least three or at least ten times per shift (i.e., per work day) for at least one performance metric to provide updated data to display to the agent in effectively real time at these time intervals.

At S110, if the system determines that the agent is not meeting one or more of the thresholds, the system computes a set of proposed KPI values for remaining time periods of the shift and displays this to the agent, via the representation at S112.

Based on the agent's performance over the shift or several shifts, a challenge may be generated automatically by the challenge component 86 system (and/or by the supervisor) at S114 and at S116 is proposed to the agent himself and/or to another agent, in the case of a tutoring challenge, e.g., via the representation 14 on the respective agent's screen.

If the challenge is accepted by an agent to whom it was proposed, at S118, the system computes whether the agent has met the challenge or not, and the award component 90 modifies the agents virtual currency balance 92 accordingly.

At any time, the supervisor may view the agent's performance or an aggregated performance of his or her group as a whole for one or more of the performance metrics (S120). The system representation generator 84 generates the aggregated data 12 for incorporating into the representation 28 for display on the supervisor's screen 32.

At S122, the agent logs off and the cumulated data for the shift may be stored in memory 62.

The method ends at S124.

As will be appreciated, the method may include other game mechanisms, such as computing and displaying current award levels for an agent, with respect to the performance metrics, computing and displaying leaderboards, and the like.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for visualizing performance data.

Further details on the system and method will now be discussed.

Key Performance Indicator Data

The KPI data 64 that are used by the system are dynamically collected by calling up various call center data sources and systems. Examples of KPI data 64 useful to a call center application may include some or all of the following:

1. Call center Service Level Agreement (SLA), i.e., the call center threshold KPIs, e.g., the minimum and maximum acceptable length for a call. The SLA may be agreed upon with a client (the outsourcing company for which the center is run).

2. Agent specific data (Switch data 44):
   a. Agent status information (e.g., handling a call, available or unavailable presence at desk);
   b. Call specific data:
      i. Start and duration of the current call, hold time, dead air time, transfer, etc.;
      ii. Average Handle Time (AHT). Handle time is calculated from the moment the call is connected to the moment the agent or the customer hangs up, including any time spent on hold or in conference. AHT is the cumulative average of this value over a predetermined time period, such as the Agent's shift or a longer period, such as a week or month;
      iii. After call work time (ACW). As for AHT, this is an average over a predetermined time period. It measures the average time between calls (unless the agent is on a scheduled break); and
      iv. Calls per hour (CPH). The total number of calls handled in an hour. Once again, this may be an average value.
      v. Transfer Rate (T). The percentage of calls transferred from the agent to another operator for handling. The upper threshold may be 10-15% of calls.

3. Call quality and topic data:
   a. Call timings: Meta data about a call obtained on the fly analyzing the call audio content: talk time, dead air time, etc. These may also be average values;
   b. Customer satisfaction (CSAT): A satisfaction score assigned to a call on the base of a survey done some time after the call itself;
   c. Agent quality scores (AQS): these quality assessments may be carried out on a periodic, e.g., a weekly basis, where a quality assurance officer listens in to an agent call and marks them in a detailed manner on a number of categories related to, for example, policy adherence, system use, technical capabilities, soft skills, and so forth. This score is usually a percentage and agents are typically expected to score 95-100% to achieve acceptable levels of quality. This may also be a KPI threshold in the SLA; and
   d. A set of keywords from a predefined list that are assigned to the call when CSAT score are assigned, describing the call content.
   e. In some embodiments, an overall quality score (Q) may be an aggregation of two or more quality scores, such as CSAT and AQS scores.

4. Scheduling data:
   a. Agent scheduling data: planned shifts and breaks.

The call center KPI thresholds can be more or less directly related to individual call center agent's KPI thresholds. For example, the constraints on the acceptable call length are translated into minimum and maximum threshold values for AHT. Other agent KPI thresholds can be related to parameters such as the agent's adherence to the schedule, the transfer rate, quality, etc.

In addition to the data above, the system may also collect call-based feedback from the agents. For example, agents may be required to or select to give feedback on each call they handle (or on calls selected periodically), indicating, for example, the call difficulty, how well they think they handled the call, and/or whether the topics were difficult for them. This information may be given to supervisors to provide feedback on how their agents are doing and can help the system and the supervisors to identify training needs.

Game Mechanics Suitable for Call Centers

Agents may be evaluated and paid based on the KPI values they obtain. The KPIs also play a role in the game mechanics. As an example, the gaming elements may include some or all of the following game aspects: Virtual Currency, Badges, Levels, Leaderboards, Progression, and Challenges, some or all of which are represented in the representation 14.

1. Virtual Currency: The system may award agents for their work in terms of a virtual currency (credits). Credits are attributed for and associated to the different categories of actions or achievements relevant within a call center and may also depend on the configuration of the call center, e.g., with respect to its SLA. By way of example, credits may be awarded for one or more of the following:

a. Handling an individual call or a group of two or more calls in a timely fashion: the amount of credits awarded may depend on the preselected timing(s), such as satisfying call related KPI thresholds, e.g., average handle time, dead air time and the like. The timing thresholds and relevance of the individual KPIs can be specific to each call center and depend on the predetermined SLA. After each call, the system can verify automatically from the switch board data 44 if these constraints are met and award corresponding credits to the agent;

b. Satisfying a KPI which is not related to an individual call, e.g., policy adherence. The conditions can also be verified automatically from the switch board data 44 and corresponding credits can be awarded in regular time intervals corresponding to the overall value achieved by the agent, e.g., overall adherence per shift computed at the end of each shift;

c. Satisfying quality requirements, e.g., obtaining a good quality assessment/CSAT score. Each time a quality assessment or CSAT becomes available within the system, corresponding credits may be automatically awarded;

d. Showing topic expertise: Strong (and also lacking) topic expertise can be identified during the quality assessments. Corresponding credits can be awarded each time a strong expertise is detected;

e. Helping other agents: If the system detects that one agent helps out another, agent credits can be awarded to the helping agent. This may occur, for example, when an agent with strong topic expertise tutors another agent with initially weaker expertise on that topic. If the second agent shows significantly increased expertise over time, this provides evidence that the first agent did a good tutoring job;

f. Challenges. Credits are awarded when an accepted challenge is met and may be subtracted when a challenge is not met;

g. Contributing to call center and/or team goals. For example, when the call center experiences particular pressure (exceptional call volume) agents may earn more credits when they are able to reduce the call length while still satisfying quality standards.

All the credits may be continuously accumulated on the individual agent's account and may be visible to the agent via the representation 14, as shown at 92 in FIG. 3. The agent can spend them, according to agreements within the call center, at any time for various things such as virtual goods, earning 'time-outs', monetary or other tangible or intangible rewards, etc. For example, Agents may spend credits in different ways including amongst others: selecting training courses to go on, the opportunity to do non-call taking work, to obtain more flexibility within their work schedule including exchanging credits with colleagues in the Agent's group for swapping breaks, shift times or asking colleagues deal with more calls than usual for a given day to keep a good team level of activity even in days they are not performing well, donating credits to other agents as rewards for support and assistance, earning time-outs, e.g., for a few seconds or minutes, getting additional breaks or longer ones or allowing agents to schedule them for their convenience, to buy virtual goods, e.g. to customize their avatars.

2. Badges: These denote the agent's level of performance for a given category over a long time period, generally more than one shift. They are attributed to the agents in regular time frames. These may correspond to meaningful evaluation periods, such as the agent's regular review periods with their supervisor. In each category, e.g., corresponding to a respective KPI or group of KPIs, the agent obtains a badge if he has earned a minimum amount of credits in this category. Different levels may exist for each category badge (e.g., gold, silver, bronze) corresponding to the amount of credits earned over the corresponding time period (i.e., corresponding to the achieved level of performance). Different badges for example, may indicate that an agent has handled a corresponding amount of calls in a timely fashion, that he satisfied the not-individual call time-related KPIs up to a certain level, how well he satisfied quality requirements, or that the agent has shown expertise in certain topics, or that he provided relevant help to his colleagues. For example, FIG. 3 shows that this agent has acquired bronze level badges 94 for three out of the four displayed KPIs (AHT, ACW, and T, but not Q).

3. Levels: Agents are situated at different levels according to the badges they own. An agent starts on the lowest level—without any badge. Once he obtains a bronze badge in all categories, indicating that he has reached a certain level of performance in all required categories, he may go up a level to the next (bronze) level, and so forth. Similarly he may move down to a lower level again if he subsequently only obtains lower level badges in some categories over consecutive time periods.

4. Leader boards: Leader boards can be presented for each level to the corresponding agents indicating how the agent is placed with respect to his colleagues.

5. Progression: The system provides information about the current situation for the agent's KPIs, the trends, and estimations of the KPI for the near future. It also detects when an agent is close to changing level, i.e., a level up or down. It can then alert the agent indicating what he can do to achieve an improvement for the level or to prevent losing a level, e.g., by suggesting that the agent should try to limit the next few calls handle time if the recent AHT was too high. As the exemplary badges are distributed in regular time intervals corresponding to the reviewing periods of the agents, such alerts may be more prevalent when the review date is close and the estimation becomes more and more accurate. However, particularly large deviations from prior performance values or rare data such as quality assessments which are carried out only a limited number of times may be used to generate earlier alerts.

6. Challenges: In the exemplary system, challenges that can be issued include wagers for the agents, which may risk a portion of their virtual currency, on improvements of a given KPI or on their overall performance. Two options are considered. In one, wagers are controlled by supervisors. In another option, they are automatically issued by the system. In the first case, a supervisor can use the system to suggest to the agent that they bet on improvements in one or more of the displayed KPIs that are not satisfactory or when the agent is close to changing level, i.e., moving to a level up or down. The agent can accept the wager or ignore it. In the second case, the system makes the suggestions to the agents for wagers on improvements of KPIs that could be made according to the given thresholds that should be respected. For example, for the calls per hour the system provides an estimation of how this can be improved on the basis of the scheduling of the work and the time interval in which the parameter is evaluated, e.g., one week or one month, and allows the agent to wager a predetermined or variable (between minimum and maximum) amount of points according to a given scale. If the agent ignores or delays accepting the wager, the system can periodically re-submit the suggestion to the agent. If the agent rejects the wager, the system may simply discard it or propose a new wager. Satisfying an accepted wager will, in turn, result in an amount of credits being granted to the agent, whereas not satisfying it may remove a predetermined amount of credits.

The system may store information about each of the agents in the agent profiles, allowing a suitable tutoring agent to be identified, based on the stored skills (e.g., his badges/levels), when it is determined that an underperforming agent could benefit from being tutored. The tutoring agent may be selected from his own team, if available.

In a similar way, the same game mechanics used for the individual agents can also be introduced for teams of agents (e.g., for a supervisor's team). In this case, the corresponding values are averaged over all team members. This represents the overall team level and allows situating the team performance with respect to the other teams. It may also identify and visualize global strengths/weaknesses in the team and thus allows the supervisor to address them with appropriate actions, e.g., through training, challenges, or exceptional awards to increase performance on particular critical performance metrics. The system can detect positive and negative trends and alert the supervisor accordingly.

From the team agent's varying topic expertise information the system can furthermore identify and highlight other beneficial information such as one or more of the following:

1. Presence within the team of agents with complementary expertise. For example, one agent may have a strong level of expertise while another has a weak level of expertise with respect to a particular topic. In this case, it can be useful to organize pairs of complementary agents in such a way that the stronger agent tutors and informs the weaker one. This can be organized by the supervisor or proposed by the system directly to the concerned agents. The pair of agents can then both wager on an improvement of the weaker agent within a given time frame. If after the predetermined time period, the expertise level of this initially weaker agent rises significantly, e.g., to a predetermined level or by a predetermined amount, the system can recognize this and award corresponding credits to the tutoring agent for helping the tutored, weaker one to improve. In some cases, the reward to the weaker agent is not through a wager but simply by being rewarded directly because he improved his topic expertise.

2. General lack within the team of a particular expertise in general. In this case, the supervisor may decide to organize corresponding trainings.

The system also integrates information about the general call center situation. From past observations, it can determine the maximum queue length that can still be appropriately processed by the call center in a given time (i.e., with a given number of scheduled agents). Monitoring the actual situation in terms of queue length and the present agents allows foreseeing critical situations and tackling them at an appropriate time. Alerts can be given when such critical situations may arise. The system can then propose that the agents can wager on faster handling of calls for a predetermined length of time, and if they do so, this can enable the whole center to avoid a critical situation and keep within an acceptable situation. Another option is to propose rescheduling of agent presence (breaks), which may be rewarded with additional credits for agents that accept the rescheduling.

A team profile may be generated and stored which aggregates the KPIs and other characteristics (badges, levels, credits, challenges accepted, etc.) of the members of the team. A call center profile may also be generated and stored which aggregates KPIs and other characteristics for the call center as a whole. The call center profile may also identify the strongest and weakest teams, according to one or more of the characteristics. The system may trigger or propose appropriate actions for call center level improvements including, for example, automatic detection of uneven distribution of skills across teams (if some teams lack particular skills whereas other teams have plenty the teams might be reorganized to redistribute skills); automatic detection of overall lacking skills (if there is some lack of particular skills, corresponding training can be proposed and organized); automatic detection whenever the queue reaches a critical threshold (this may trigger challenges motivating agents to shorten the call handle time in order to keep the queue manageable. If the goal is reached, the agents participating can be awarded additional credits).

The client side of the system provides the agents with a synthetic graphic representation 14 of information on their own performance, their credits, as well as the opportunities for improvement. Given the typical characteristics and constraints of a call center, the interface 14, 28 may have the following characteristics:

1. It is easily accessible e.g., always visible on the screen, to keep the users presently aware of the actual and evolving situation;

2. It is simple and intuitive such that the operator can understand the current situation at a glance, without any particular effort and without distracting the operator from his or her primary work;

3. It is of relatively small size, occupying a small portion of the operator's screen, especially for the agents because the large majority of the screen area is generally already occupied by the various tools needed to perform their work. For example, the typical desktop of an agent in a call center is crowded with tools providing access to knowledge bases and customer relationship management environments used to record call data and to access content that may be relevant to answer the customer's questions or to perform a required task 4. It may be reconfigurable. For example, the agent or another call center operator may decide which KPIs and/or how many should be displayed on the first screen of the agent's visualization 14 (FIG. 3).

By way of example, the client interface 14, 28 may be in the form of a desktop widget of relatively small size that sits permanently on the operator's (agent's or supervisor's) desktop and that can provide all the information at a glance.

Agent Visualization

As illustrated in FIG. 3, the exemplary agent representation (or widget) 14 includes, for the respective agent, at least some of the following:

1. A visualization of a customizable selection of KPIs. For example, from 1 to 10 KPIs are displayed. This provides, at a glance, information about: (a) whether the average value for the displayed KPIs for that agent fall within or outside the predetermined threshold for the respective KPI at a specific point in time or in real time; (b) the trend of the average values for the displayed KPIs for the agent's ongoing work day across regular time intervals or in real time; and (c) for all selected KPIs, the badges 94 representing their current skill level (bronze, silver or gold). In FIG. 3, four KPIs (AHT, ACW, Q, and T) are displayed by way of example, each occupying a sector (e.g., a quadrant) of an annular trend indicator 96. Each sector is marked in increments of time that together span the agent's shift. As this agent starts the shift at 0700 hrs. and ends at 1700 hrs., each quadrant is divided into increments of 30 minutes during this time period. Each increment of time for which a cumulated average of the respective KPI has been completed is represented by a color-coded bar 97. The color and/or length of the bars, or other graphically represented markings, indicate whether the agent is meeting the target KPI threshold or is falling short of the KPI threshold. For example, the time increment is color coded with a red bar 97 (shown in black in the illustration) if he is meeting the target KPI threshold for the shift up to that point and with another color bar (shown in white) if he is not. The center 98 of the widget 14 may display customizable information, such as the time of day, total number of credits earned over the ongoing reviewing period, or one of the agent's current KPI values.

Figure 4:
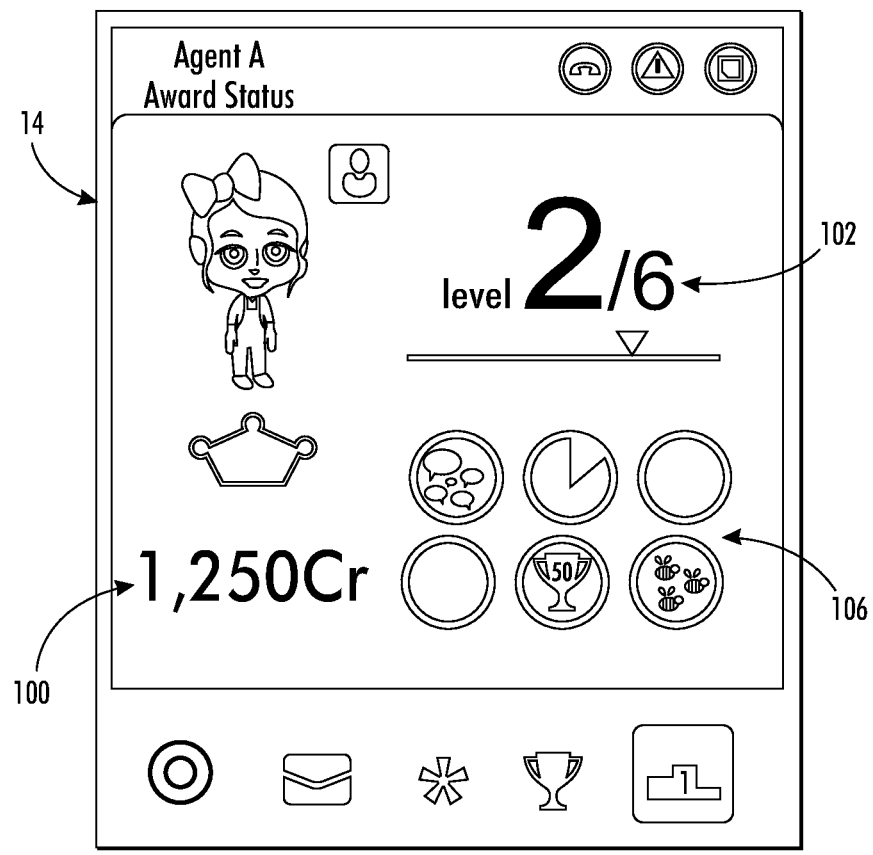
FIG. 4 illustrates a graphical representation of an agent's award status (current level, credits, and badges) in accordance with another aspect of the exemplary embodiment.
Figure 5:
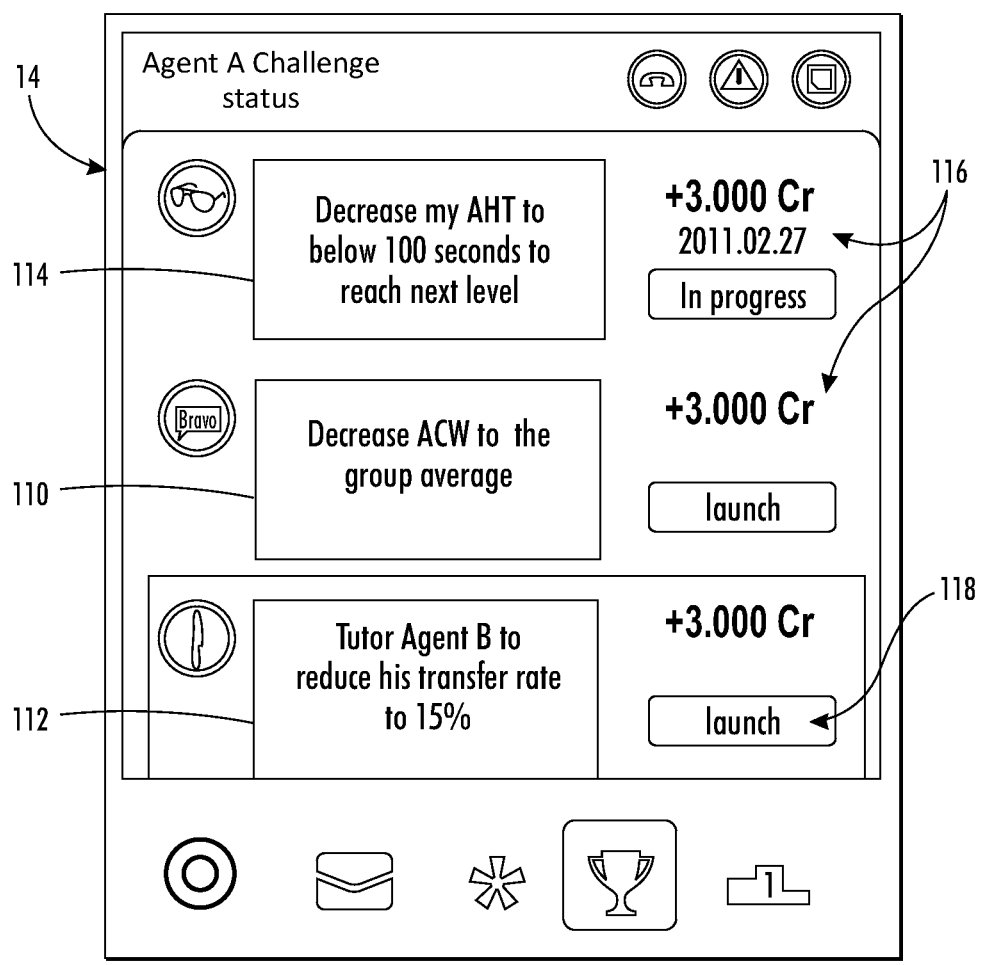
FIG. 5 illustrates a graphical representation of an agent's challenge status in accordance with another aspect of the exemplary embodiment.
Figure 6:
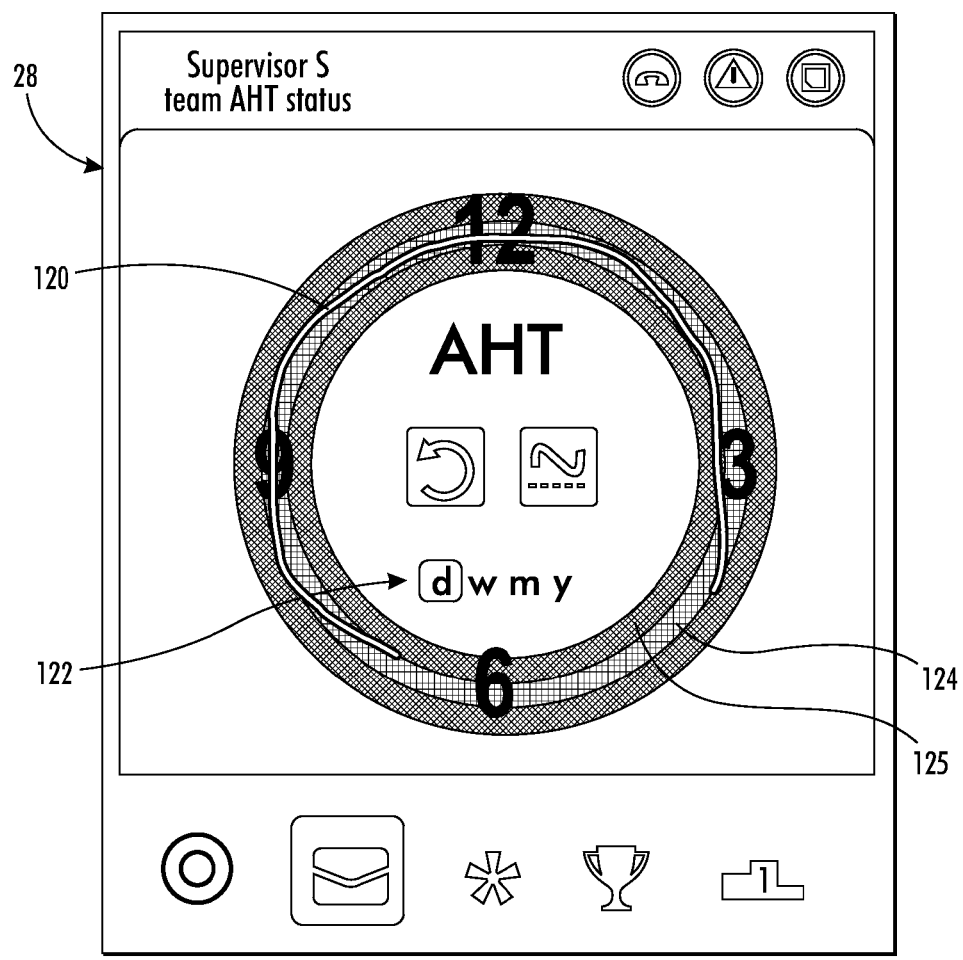
FIG. 6 illustrates a graphic representation of a team's performance metric values in accordance with another aspect of the exemplary embodiment.

Using the navigation tabs 100 at the bottom of the widget 14, the agent can access additional visualizations (windows). One of these may be an overview of the user's awards, as shown in FIG. 4. For example, these include the current level (degree of expertise) 102, credits 104, and badges 106 gained by the agent. Another window may illustrate the challenges proposed to the agent, as illustrated in FIG. 5. Another window may show a longer term trend for the agent, similar to that shown in FIG. 6.

2. Challenges, e.g., invitations to wager on improvements of the KPI performance displayed. For example, if the agent is not meeting threshold KPIs or is close to achieving a new level for a particular KPI/Badge, he may be provided with one or more new challenges 110, 112 through a new window of the widget 14, as shown in FIG. 5. Here, any ongoing challenges 114, as well as the rewards 116 for meeting those challenges, are displayed. If an agent wishes to accept a challenge (or find out further details), he may click on the respective launch button 118. In some embodiments, he may be penalized (e.g., by a reduction in his accumulated points) for not meeting a challenge that he accepts.

3. A detailed, comparative visualization of an individual, selectable KPI for an agent, e.g., versus the team or the overall center average values with customizable time intervals (e.g., day, week, or month). This provides to the agent (or supervisor), at a glance, information about whether the average values for the displayed KPI for that agent, the team, and call center as a whole fall within or without the required threshold at all points in time for the selected time interval and provides information about the corresponding performance levels. For example, the AHT trend for a supervisor's team is shown at 120 in FIG. 6 and the selected time period at 122. Maximum and minimum team threshold values for the AHT KPI are show at 124 and 125. As will be appreciated, the KPI view may be configured to show more than one trend, such as the agent's performance on this metric vs. the team as a whole.

4. Prospective Information:
   a. given the current trend for any given KPI, the projected performance for the rest of the shift, week, or month can be computed;
   b. given the distance of the current average performance value for any KPI from the current threshold value(s) for that KPI, the system can compute (i) for agents who are underperforming, the values of the respective performance metric(s) which would bring the average value for the KPI within the target threshold(s) over the rest of the shift, week or month; and (ii) for agents who are not underperforming, the average value for the KPI to maintain the current average values over the rest of the shift, week or month.

Figure 7:
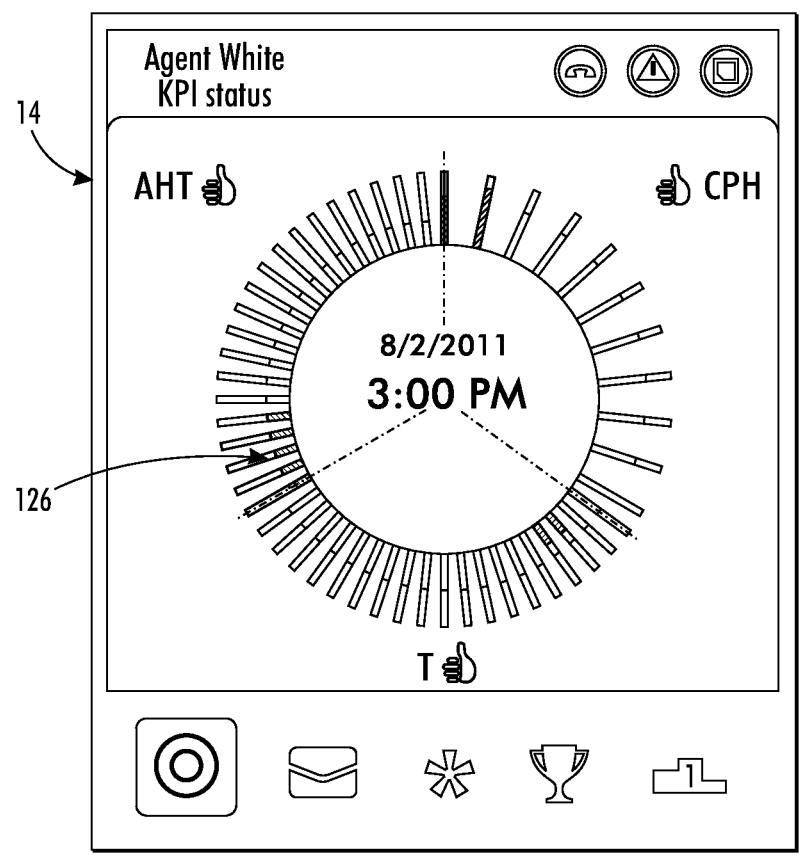
FIG. 7 illustrates a graphical representation of an agent's performance metric values in an example case.

As an example of the use of prospective information, FIG. 7 shows a widget 14 which displays three selected KPI sectors for AHT, CPH, and T, respectively, for one agent, "Agent White". Agent White begins his shift at 1 pm on Monday. His Average Handle Time (AHT) for the previous week was rather high, so he is determined to make an effort this week to keep his average value below the threshold for every shift. The data bars 126 represent the cumulated average value, refreshed every thirty minutes. The radial height of each bar represents the cumulated average KPI value and its color indicates whether the value meets the target KPI threshold, in the case of AHT, whether it is within an acceptable range. For the first two hours of his shift (from 1-3 pm) it can be seen that Agent White manages to keep his average handle time below the maximum threshold value.

Figure 8:
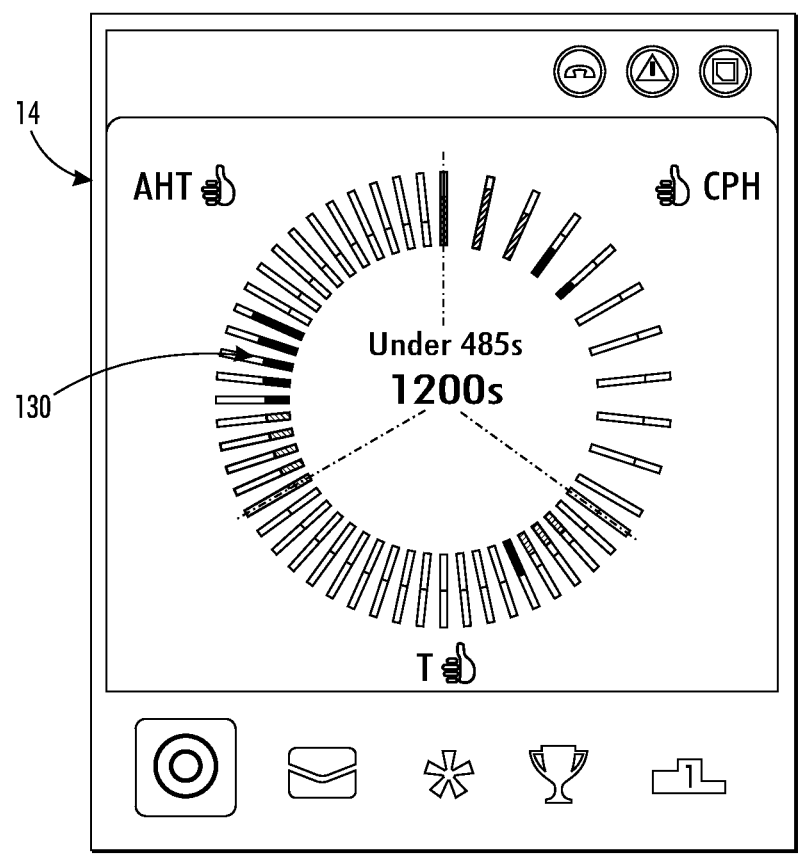
FIG. 8 illustrates a graphical representation of the agent's performance metric values in the example case, later in the shift.

However, over the next 2.5 hours of his shift, Agent White receives a number of particularly long phone calls and a few that are slightly above average length, which push his average AHT for the shift above the maximum threshold value, as illustrated at 130 in FIG. 8.

Figure 9:
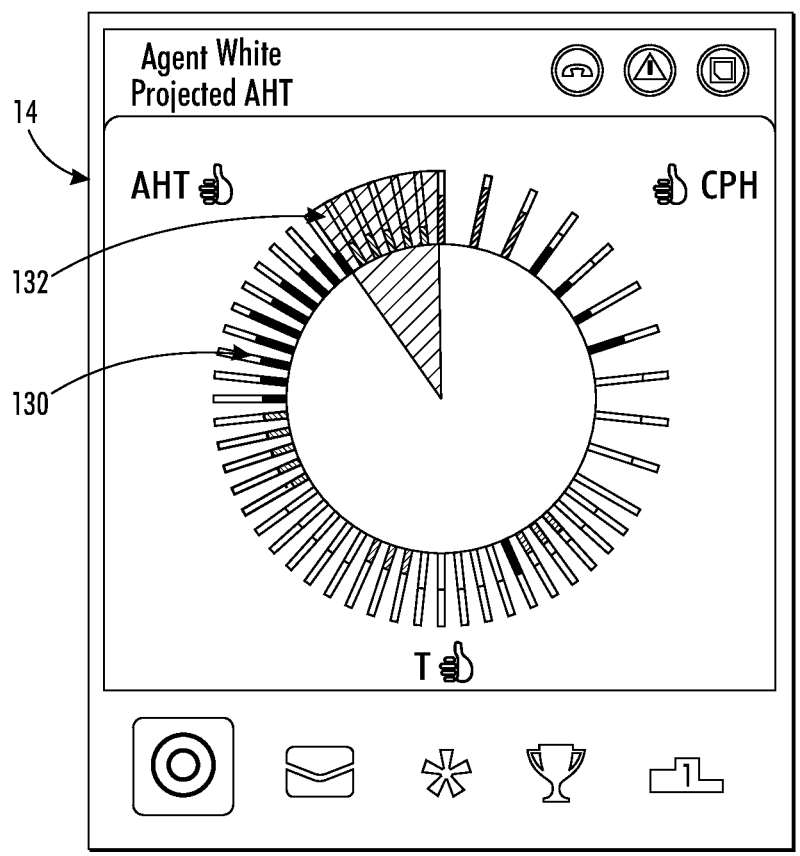
FIG. 9 illustrates a graphical representation of the agent's projected performance metric values in the example case of FIG. 8.

The representation 14 enables Agent White to see clearly, in real time, that his average handle time is now too high, and that it has been steadily increasing since the beginning of his shift. The system, however, also tells him that with 5.5 hours left on his shift, and with an average of 6.5 calls per hour, he can still bring his average handle time below the maximum threshold in this shift, as illustrated by the projected bars 132 (shaded) in FIG. 9. A different color may be used for the prospective bars, to indicate that they represent projected values, and/or the area may be highlighted, as shown by the pie-shaped region 134. The representation may also or alternatively provide the agent with the information that with four shifts left in the week, can still end the week with a better score than he managed the previous week.

Figure 10:
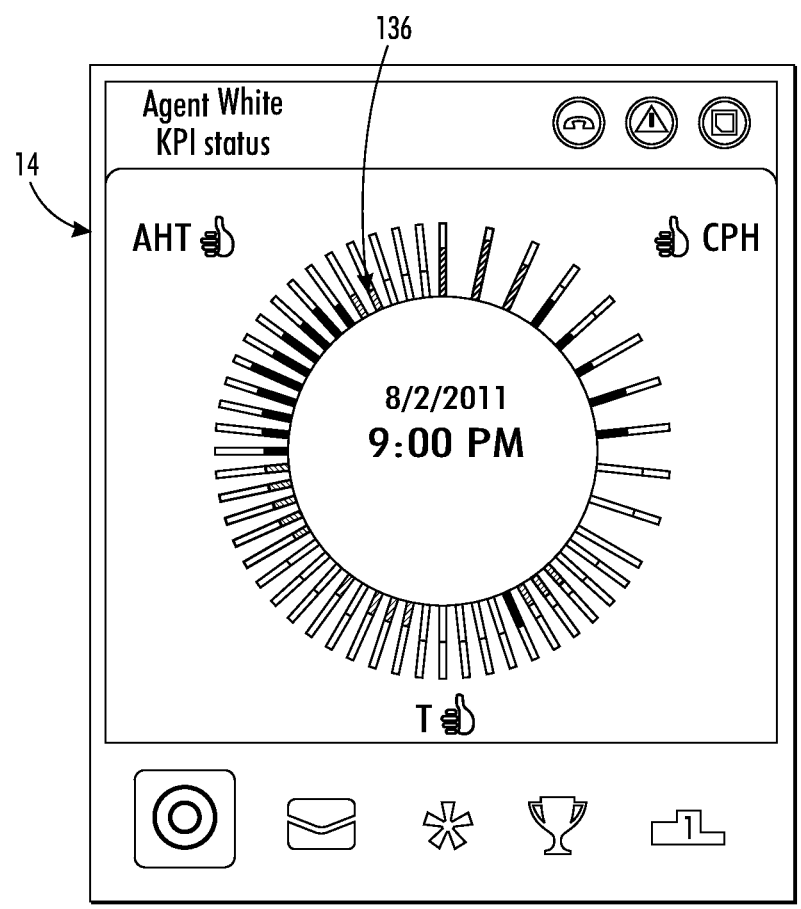
FIG. 10 illustrates a graphical representation of the agent's performance metric values toward the end of his shift when he has been able to return to an acceptable average handle time (AHT) value.

The system helps Agent White by providing clear, at-a-glance and real-time information about his past, current and projected performance levels, and allows him to self-monitor more effectively. Over the rest of the shift, agent White can make the extra effort on those features of the phone calls that he can exercise some control over (e.g., he maximizes the use of his on-line knowledge base rather than asking a supervisor for help when he needs assistance and ensures that he does not lose time in idle chatter with the customers, while still remaining attentive and polite, as company policy demands). In this way, he manages to bring his average handle time back below the maximum threshold before the end of the shift, as illustrated at 136 in FIG. 10.

The processing for generating the widget 14 may be largely performed on the server computer 16, as noted above, with the client devices 18, 20 simply calling on the server 16 for the data which the user has requested to be presented, via user clicks on the widget.

Supervisor Visualization

Figure 11:
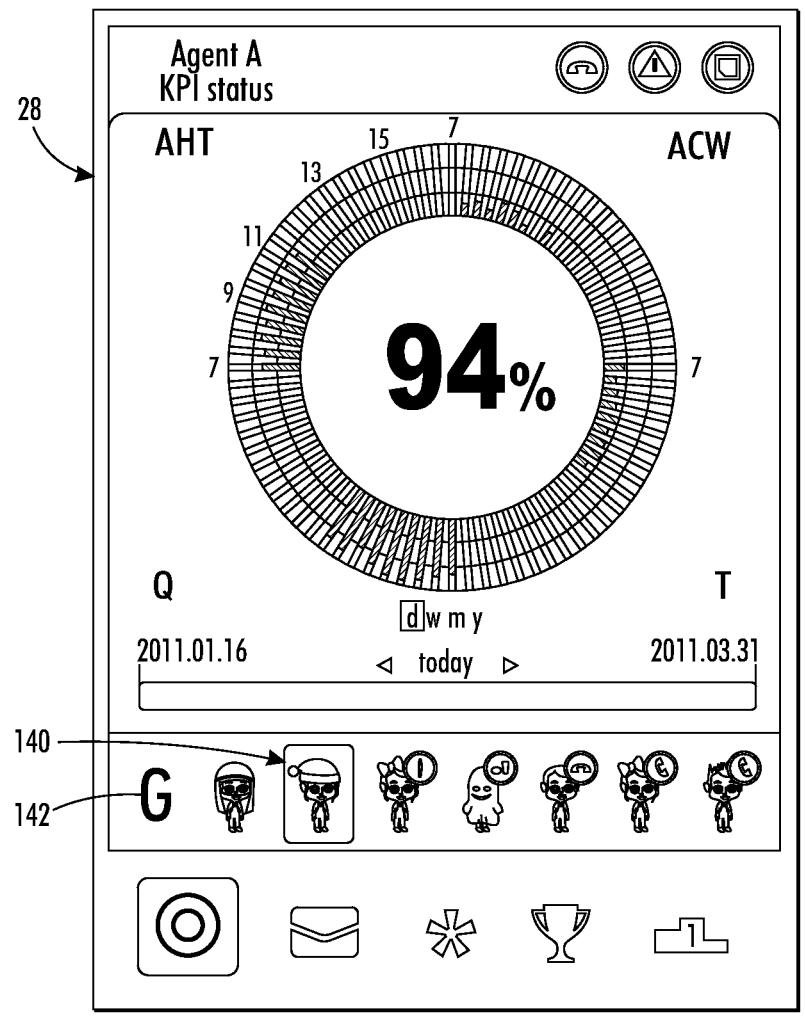
FIG. 11 illustrates a graphic representation of an team's performance metric values in accordance with another aspect of the exemplary embodiment.

Team supervisors have their own version 28 of the client which may display the same type of information present in the agent client 14, but gives supervisors the ability to select and visualize the performance of any of the agents on their team, or the average performance of the whole team. Generally the supervisor does not take calls, so the widget 28 does not visualize his own performance in this respect. FIG. 11 shows an example of the visualization of the performance of an individual team member on the widget 28. Each of the team members may be represented by a respective selectable icon 140, such as the avatars illustrated in FIG. 11. The supervisor can click on the icon 140 to retrieve that agent's data, or on a group icon 142 to review the aggregated (e.g., average) performance metrics for the team as a whole. An overall aggregate performance score for the selected agent is shown in the center (94%).

Figure 12:
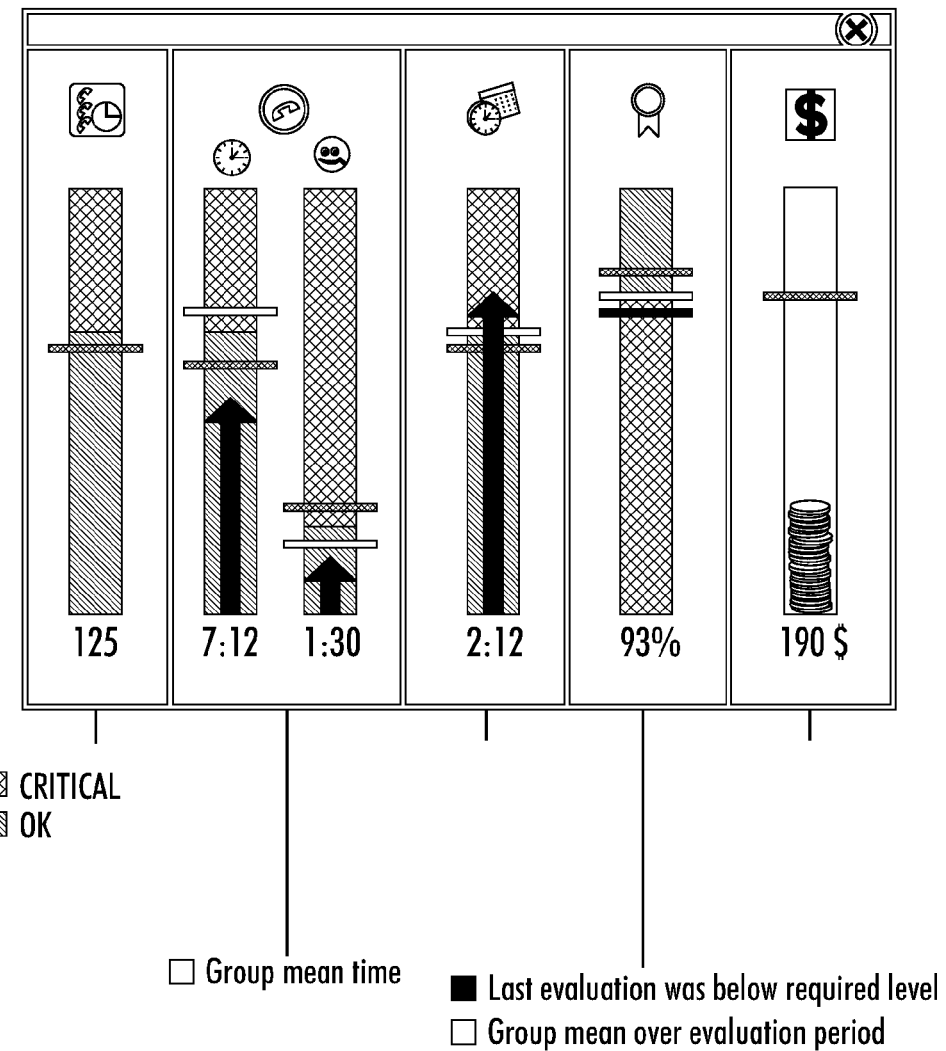
FIG. 12 illustrates a graphic representation of an agent's performance metric values in accordance with another aspect of the exemplary embodiment.

As will be appreciated, the method is not limited to the pie-shaped graphical representations shown in FIGS. 3-11. For example, the various KPIs may be displayed as slider bars, as illustrated, for example in FIG. 12.

It has been found that in the absence of the appropriate levels of situational awareness and motivation for the agents, it becomes difficult for call centers (represented operationally either by supervisors or operations managers) to justify the need for agents to push their performance beyond their minimum requirements, even when and where there is room for improvement at the individual agent level that would in turn improve the aggregate performance of the call center as a whole.

Therefore, call centers services providers would benefit from having solutions to the problem of providing agents with continual, dynamic information about individual, team and call center performance.

The exemplary system and method can assist in reducing attrition at call centers, as well as increasing customer satisfaction and client satisfaction (for whom the client center is performing the calls).

The exemplary system and method attempt to overcome some of the problems in a call center by providing agents with an appropriate level of feedback or "situational awareness" through use of the representation 14. This can help to give the agents an understanding of their ongoing performance within the broader context of the operations of the call center as a whole, and of the relation between their individual performance metric and the aggregate metrics for their respective teams and the call center as a whole. The exemplary system and method also serves to provide appropriate motivation and performance related incentives to employees who, due to the isolated and repetitive nature of the work, may lack intrinsic motivation and a sense of belonging to a community or organization with common goals and objectives. This may be achieved by rewarding mutual support, the attainment of shared objectives, and knowledge sharing as well as individual performance.

Through the representation 14, 28 agents (and supervisors) can be provided with an integrated visualization of relevant elements of information on their work environment's status at call center, team, and individual levels, and of potential improvements of performance, expertise, and quality of work experience in an integrated and real-time fashion. The exemplary system and method employ game mechanics whose selection and instantiation has been informed by case studies conducted in call centers performing inbound activity, although the system and method are not limited to the specific game mechanisms described herein. To reduce distractions, the games disclosed can be relatively simple. Narratives and complex three dimensional representations are not considered necessary or even beneficial, in most cases. In the exemplary embodiment, some or all of the following game mechanisms can be employed: progression, virtual currency, levels, badges, leaderboards, and challenges. While these are known game mechanisms in other contexts, the present system provides call center operatives both the incentives to improve performance and also a display of how this can be achieved, via the representation 14.

The exemplary system and method aid in closing the performance feedback loop between agents and supervisors by providing agents with near real-time access to their current performance metrics and trends. In particular, this information is provided to each agent by the representation 14 without the agent having to log in to a separate system while they are taking calls. This enables the agents to self-monitor their performance more effectively in between the weekly milestones that are already in place.

The exemplary system and method can provide clear and shared objectives with direct access to relevant metrics. For example, the agents and supervisors may be able to compare their performance to that of their team and the call center as a whole and to understand better the relationship between their performance and the organizational goals of the call center. Supervisors are able to identify easily those agents and teams which have the best margins of improvement on strategically relevant metrics at any point in time and challenge or encourage them to improve.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for visualizing performance metrics comprising:
   a server computer and a plurality of client computing devices in communication with the server computer, the server computer comprising:
      a data acquisition component which collects information related to a set of agents operating in a work environment;
      a performance metric computation component which computes, for at least one of the agents, an aggregated value for a performance metric at each of a plurality of times within a selected time period;
      a representation generator which generates representation data for generating a representation of the at least one agent's values for the performance metric at each of the plurality of times during a selected time period for display to the respective agent; and
      a processor which implements the data acquisition component, the performance metric computation component, and the representation generator;
   the client computing devices including a client computing device for the at least one agent which displays the representation, the representation providing the agent with information on the agent's current aggregated value for the performance metric for each of the plurality of times, the representation being configured for displaying, during the time period, an indication of whether a projected value for the agent's performance metric over the selected time period is predicted not to meet at least one threshold value for the performance, and for presenting proposed values of the agent's performance metric to the agent for future times in the selected time period in order for the agent to meet the threshold value for the selected time period.

2. The system of claim 1, wherein the representation is configured for displaying an indication of whether the agent's values for a performance metric at each of a plurality of the times meet a threshold value for the performance metric.

3. The system of claim 1, further comprising a challenge component which generates a challenge for presenting to the agent when an average value for the performance metric for the agent or for another agent does not meet a threshold value.

4. The system of claim 3, wherein the challenge provides for an award of virtual currency to be credited to the agent if the challenge is met.

5. The system of claim 4, further comprising an award component implemented by the processor which computes a current value of the agent's virtual currency.

6. The system of claim 3, wherein the challenge provides for an award of virtual currency to be credited to the agent if the agent tutors another agent such that the other agent's average value for the performance metric meets a target value for the performance metric.

7. The system of claim 1, further comprising a plurality of client devices including at least one agent computing device for displaying the representation to the agent.

8. The system of claim 7, wherein the plurality of client devices comprises at least one supervisor device for displaying the representation for each of a plurality of agents to a supervisor.

9. The system of claim 1, wherein the work environment is a call center and wherein the agents answer telephone calls.

10. The system of claim 9, wherein the performance metric is based on data representing switch information for the agent's telephone.

11. The system of claim 9, wherein the performance metric comprises at least one of an average handle time, which is an average of the time spent by the agent on each call, an average after call work time, which is an average of time spent between calls, and an average transfer rate, which represents the proportion of calls that are transferred from the agent to another agent, and an average number of calls per hour.

12. The system of claim 1, wherein the performance metric comprises a plurality of performance metrics.

13. The system of claim 1, wherein the information related to the agents operating in the work environment is selected from the group consisting of: switch information for the agent's telephone, information in a supervisors report on the agent, customer survey information, and analyst assessment information, and combinations thereof.

14. The system of claim 1, wherein the representation for display to the agent includes, for each of a set of time periods throughout the selected time period, a representation of the agent's current value as an average value for the performance metric over the time periods worked by the agent since the beginning of the selected time period.

15. The system of claim 1, wherein the performance metric computing component computes the performance metric for each of a plurality of agents and the representation generator generates a respective representation for each of the plurality of agents.

16. A method for visualizing performance metrics comprising:
   with a server computer in communication with a plurality of client computing devices:
      collecting information related to a set of agents operating in a work environment;
   with a processor, computing, for one of the agents, a respective aggregated value for a performance metric at each of a plurality of times within a selected time period; and
   generating graphical representation data for display as a representation to the agent;
   with one of the client computing devices, displaying the representation to the agent, the representation providing the agent with information on the agent's current value for the performance metric, wherein the representation displays an indication when a projected value for the performance metric over the selected time period is predicted not to meet at least one threshold value for the performance metric, and is configured for presenting proposed values of the performance metric for future times in the selected time period in order for the agent to meet the threshold value for the selected time period.

17. The method of claim 16, wherein if the current aggregated value does not meet a threshold value for the performance metric, the method further comprises computing a proposed value of the performance metric for each of at least one future time period that will enable the agent to meet the threshold value within the selected time period and incorporating the proposed value in the representation.

18. The method of claim 16, wherein the representation is configured for displaying challenges to the agent for which an award of virtual currency is available and wherein when the agent meets a displayed challenge, the method includes crediting the agent with an amount of the virtual currency.

19. The method of claim 16, further comprising generating a representation for display to a supervisor of a team of the agents, the representation being based on the acquired data for the agents in the team.

20. A system for performing the method of claim 16, comprising memory which store instructions for performing the method and a processor in communication with the memory which execute the instructions.

21. A computer program product comprising a non-transitory storage medium storing instructions, which when executed by a processor, perform the method of claim 16.

22. A system for visualizing performance data to agents in a call center comprising:
   a server computer which acquires data from a plurality of sources related to a set of the agents and incrementally computes, for at least one of the agents, a value for a performance metric at each of a plurality of times within a selected time period, based on the acquired data, at least one of the sources of data comprising switch information for the agent's telephones; and
   a plurality of client computing devices in communication with the server computer, the client computing devices including a client computing device for the at least one agent which displays a representation of the respective agent's values for the performance metric at each of the plurality of times during a selected time period, whereby the agent is able to determine whether the agent is meeting at least one threshold value for the performance metric, and for computing a set of proposed performance metric values for remaining times of the time period in order for the agent to meet the threshold value for the selected time period, and displaying them to the agent, via the representation.

* * * * *